United States Patent Office.

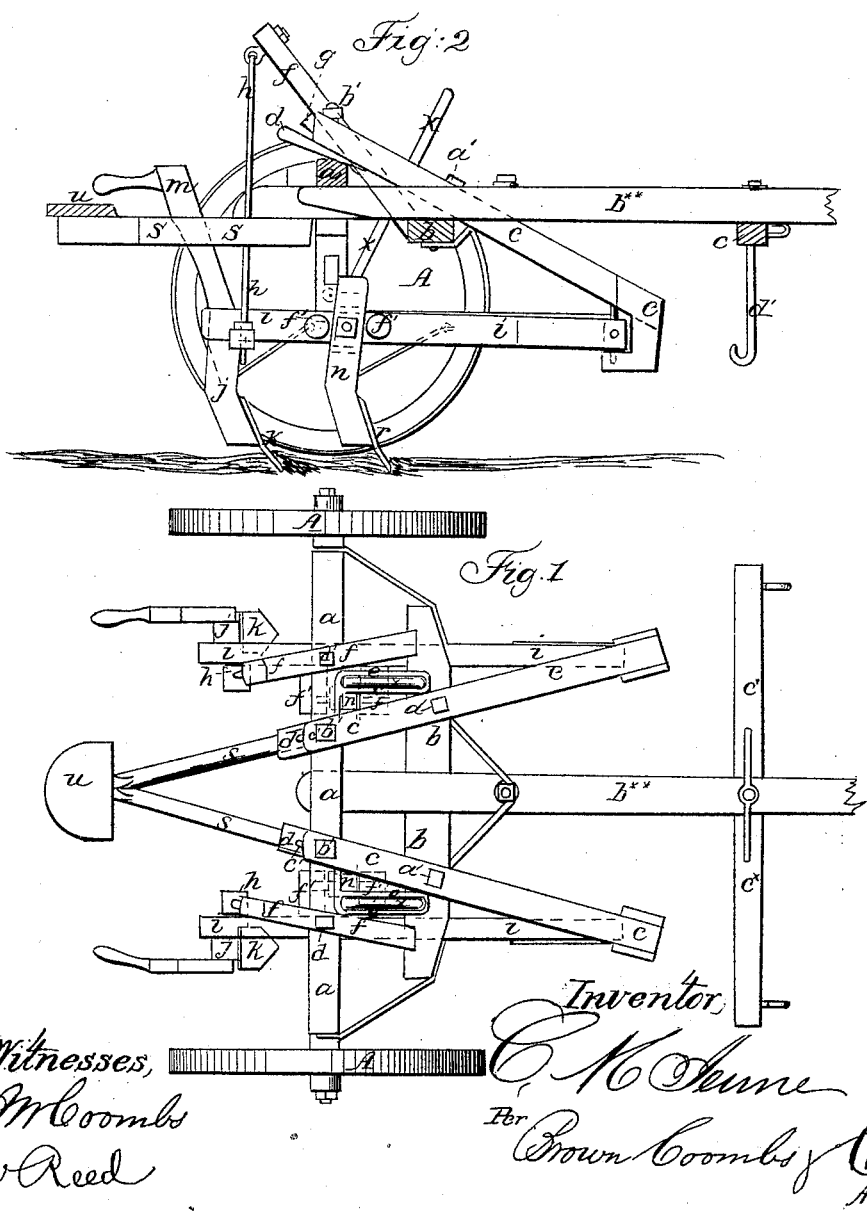

C. M. JENNE OF YOUNG AMERICA, ILLINOIS.

Letters Patent No. 69,442, dated October 1, 1867.

IMPROVEMENT IN CULTIVATORS.

The Schedule referred to in these Letters Patent and making part of the same.

TO ALL WHOM IT MAY CONCERN:

Be it known that I, C. M. JENNE, of Young America, in the county of Warren, and State of Illinois, have invented certain new and useful Improvements in Cultivators; and I do hereby declare that the following is a full, clear, and exact description of the same, reference being had to the accompanying drawings, making a portion of this specification, in which—

Figure 1 is a plan view of a cultivator constructed according to my invention.

Figure 2 is a vertical longitudinal section of the same.

Similar letters of reference indicate corresponding parts in both figures.

This invention relates to that class of wheeled cultivators designed to operate simultaneously upon both sides of a row of corn, potatoes, or other farm produce, and in which a seat is provided in such manner that the person using the cultivator may ride while so doing.

The invention consists in beams working upon universal joints at the sides of the main frame of the machine, furnished with suitable shares and handles, and so arranged in relation with the seat that the driver or operator may readily move or manipulate the aforesaid shares as may be requisite in the operation of the cultivator. The invention further consists in providing for a vibratory movement of a portion of the shares just mentioned, whereby in certain contingencies the efficiency of their action is materially increased: and furthermore, the invention consists in a novel means whereby the shares may be very readily adjusted to penetrate the soil to any desired depth.

To enable others to understand the construction and operation of my invention, I will proceed to describe it with reference to the drawings.

The main frame of the cultivator, supported upon two suitable wheels A, consists of two parallel bars $a$ $b$, secured transversely upon the rear end of the draught-pole $b^{**}$, this latter being furnished with a suitable double-tree or cross-piece, $c^*$, upon the under side of which may be provided two inclined feet $d^*$, the office of which is to sustain the said pole when the apparatus is not in use. Bolted to the forward bar $b$, by bolts $a'$, are two bars, $c$, which project obliquely forward and downward. The uppermost ends of such oblique bars are situated just over the rearmost transverse bar $a$, and are connected therewith by bolts $b'$ passing through suitable holes provided for their reception. Placed between the ends just mentioned of the oblique bars $c$ and the adjacent transverse bar $a$, are slotted wedges $d$, the bolts $b'$ passing through the slots $c'$ of the said wedges to hold them in their places, the object of the said wedges being to provide for elevating or lowering the forward ends of the oblique bars $c$, as required in adjusting the shares of the cultivator, as hereinafter set forth. Provided at the outer side of each of the oblique bars $c$, between the two transverse bars $a$ $b$, is a slotted guide, $e$. Situated upon either side of the two oblique bars is an inclined bar, $f$, the forward or lower end of which is notched, so as to fit upon the corner or edge of the transverse bar $b$, and the central part of which is connected with the bar by bolts $d'$. Placed between the bar $a$ and each of the inclined bars $f$ is a slotted wedge, $g$, the longitudinal adjustment of which serves to raise or lower, as the case may be, the upper or rearmost end of each inclined bar $f$, the said end being furthermore connected by a rod or chain, $h$, with the rear end of a beam, $i$, the forward extremity of which is pivoted by a horizontal bolt to a block, which is in turn pivoted by a vertical bolt to the forward extremity of the contiguous oblique bar $c$, the beam being thus connected with such oblique bar by a universal joint. Each of the beams $i$ is furnished at its rearmost end with a suitable share-stock, $j$, and share $k$, and also with a lever or handle, $m$, of any appropriate form. Projecting from the inner side of each beam are two lugs $f'$, between which is pivoted a share-stock, $n$, provided at its lower end with a share, $r$, and capable of a lateral vibratory movement upon its pivot, and having furthermore any upwardly extending arm $x$, which passes through the slot of the guide $e$ adjacent. Extending back from the bars $a$ $b$ is a strong framework, $s$, which supports a seat, $u$, which is occupied by the person using the cultivator, the handles $m$ being in such proximity to the said seat as to be easily reached therefrom.

In using the cultivator the operator takes his place in the seat, as just mentioned, and the apparatus is drawn by suitable draught animals, with its wheels upon opposite sides of the row of corn or other plants to be cultivated, and the shares $k$ $r$ of the beams $i$ operating at the opposite sides of the said row, dig, plough, or cultivate the soil at the said sides. The beams $i$ being hung on universal joints may be either raised or moved laterally by the operator or attendant, as the machine is drawn along, should circumstances so require. Inasmuch as the stocks of the shares $r$ are pivoted to the aforesaid beams, with their stems extending up through the slotted guides $e$, it follows that a vibrating lateral movement of the beams, will communicate a peculiar vibrating motion to the shares $r$, which renders their action in stirring the soil much more efficacious than would be the case if their movement were simply forward with the movement of the machine. In order to increase or diminish the depth to which the shares $k$ $r$ penetrate the soil, the wedges $g$ are adjusted to raise or lower the rear or upper ends of the inclined bars $f$, and consequently the beams suspended therefrom, while in order to change the inclination of the shares the wedges $d$ are adjusted to depress or elevate, as the case may be, the forward or lower ends of the oblique bars $c$, and consequently by changing the position of the beams $i$ to change that of the shares.

What I claim as my invention, and desire to secure by Letters Patent, is—

1. The arrangement with reference to the seat $u$ of the beam $i$ working upon universal joints, and provided with suitable shares and handles, substantially as and for the purpose specified.

2. The share-stocks $n$, pivoted to the beams $i$, and furnished with stems $x$ extending through the slotted guides $e$, substantially as and for the purpose specified.

3. The wedges $g$, in combination with the inclined bars $f$, rods $h$, and beams $i$, whereby the said beams with the shares attached thereto may be raised or lowered, substantially as herein set forth.

4. The wedges $d$, in combination with the oblique bars $c$, in such manner that the position of the said bars may be changed to adjust the position of the beams, substantially as herein set forth.

C. M. JENNE.

Witnesses:
 OSCAR JENNE,
 W. H. JENNE.